(12) United States Patent
Wen et al.

(10) Patent No.: US 6,768,775 B1
(45) Date of Patent: Jul. 27, 2004

(54) VIDEO CODEC METHOD IN ERROR RESILIENT MODE AND APPARATUS THEREFOR

(75) Inventors: Jiangtao Wen, Los Angeles, CA (US); John D. Villasenor, Los Angeles, CA (US); Jeong-hoon Park, Seoul (KR)

(73) Assignees: Samsung Electronics Co., Ltd., Kyungki-do (KR); The Regents of the University of California, Oakland, CA (US)

( * ) Notice: Subject to any disclaimer, the term of this patent is extended or adjusted under 35 U.S.C. 154(b) by 546 days.

(21) Appl. No.: 09/201,865

(22) Filed: Dec. 1, 1998

Related U.S. Application Data

(60) Provisional application No. 60/067,013, filed on Dec. 1, 1997.

(51) Int. Cl.[7] ................................................. H04N 7/12
(52) U.S. Cl. .............................. 375/240.23; 375/240.01
(58) Field of Search ....................... 375/240.23, 240.01; 341/57, 58, 59, 60, 61, 62

(56) References Cited

U.S. PATENT DOCUMENTS

| 5,231,486 A | * | 7/1993 | Acampora et al. | ..... 375/240.23 |
| 5,488,616 A | | 1/1996 | Takishima et al. | .......... 714/746 |
| 5,852,469 A | * | 12/1998 | Nagai et al. | ........... 375/240.23 |

FOREIGN PATENT DOCUMENTS

| EP | 070425 A2 | 4/1996 |
| JP | 6-205384 | 7/1994 |
| JP | 7-23346 | 1/1995 |
| JP | 8—111867 | 4/1996 |
| JP | 8-340258 | 12/1996 |
| JP | 10-336042 | 12/1998 |

OTHER PUBLICATIONS

The Institute of Television Engineers, Dec. 12, 1996, pp. 45/50.
International TelecommunicationUnion (White Book), pp. 387–392.
MPEG—Ohmsha—pp. 55–58.

* cited by examiner

*Primary Examiner*—Chris Kelley
*Assistant Examiner*—Allen Wong
(74) *Attorney, Agent, or Firm*—Sughrue Mion, PLLC

(57) ABSTRACT

A video coding-decoding (CODEC) method in an error resilient mode, a computer readable medium having a computer program for the video CODEC method, and a video CODEC apparatus. The video CODEC method provides more resilience against channel error such that communications are less affected by error under conditions in which errors are a serious problem such as in a wireless communications channel. In the video CODEC method, a header data part (HDP) bit region, a motion vector data part (MVDP) bit region and a discrete cosine transform data part (DDP) bit regions are partitioned from each macro block of the video data in an error resilient mode, and then the partitioned bit regions are variable-length-coded. Then, the bit regions selected from the variable-length coded bit regions according to a predetermined priority for recovery are reversible-variable-length-coded, and markers are then inserted into the variable-length coded or reversible-variable-length-coded bit regions.

36 Claims, 4 Drawing Sheets

VIDEO CODEC METHOD IN ERROR RESILIENT MODE AND APPARATUS THEREFOR the present application is based on U.S. Provisional Patent Application No. 60/067,013 filed Dec. 1, 1997, entitled "video CODEC Method in Error Resilient Mode", by the present applicant.

BACKGROUND OF THE INVENTION

1. Field of the Invention

The present invention relates to a video coding-decoding (CODEC) method and an apparatus therefor, and more particularly, to a video CODEC method in an error resilient mode and an apparatus therefor.

2. Description of the Related Art

In general, in case that an error exists in a channel, video CODEC cannot cope with error of the channel when encoding all frames into bit streams. This is because the bit streams have no decision element for determination of whether to restore or discard the error region. Thus, it is difficult to determine whether a certain portion of a frame has bit loss by an error, or whether the entire frame has an error, so that there is a problem that a start point of the bit stream should be searched in the next frame, ignoring the coded bit stream of the entire frame. In a conventional CODEC, an additional device is used as the decision element in order to solve such problem. As an example, according to the CODEC defined in the H.263 standard, a picture start code (PSC) is employed and if an error is detected after this field information, the region following the PSC is ignored and the next PSC is then searched. Further, a group of block start code (GBSC) indicating the start of the group of block (GOB) is employed and if an error is detected after this information, only the corresponding block of the GBSC is ignored and then the next GOB is searched, thereby reducing the amount of the ignored region.

FIG. 1 shows an example of a video data packet generated by a conventional CODEC in an error resilient mode. The video data packet of FIG. 1 is an example of the video data packet generated in the MPEG-4 CODEC. Referring to this packet, in the conventional error resilient CODEC, data is divided into motion data and texture data for coding. The motion data consists of a macro block identification bit (COD) indicating whether or not coding is performed, a macro block pattern chrominance (MCBPC) bit indicating the chrominance of each macro block and a motion vector, and the texture data consists of coded block pattern luminance (CBPY) data, data quantization (DQUANT) data and discrete cosine transform (DCT) data. Such motion data and texture data are divided by a motion marker (MM). Also, the DCT data is coded by reversible variable length coding (RVLC).

The decoding process of the bit stream coded in the above manner will be described. First, a resync marker RM is searched in the bit stream. If an RM is found, information up to the next RM is regarded as one packet. A motion vector data part (MVDP) consisting of motion vectors has only predicted motion vectors, so that it is possible to use an actual motion vector only when the previously decoded motion vector exists. Thus, if an error is detected from the MVDP of the bit stream, the corresponding entire packet is ignored, and an RM corresponding to the next packet is searched for decoding, thereby causing loss of a large amount of information.

SUMMARY OF THE INVENTION

To solve the above problems, it is a first object of the present invention to provide a video coding-decoding (CODEC) method in an error resilient mode.

It is a second object of the present invention to provide a computer readable media having embodied thereon a computer program for the video CODEC method in an error resilient mode.

It is a third object of the present invention to provide a video CODEC apparatus in an error resilient mode, achieving the video CODEC method.

Accordingly, to achieve the above first object, there is provided a video CODEC comprising the steps of: (a) partitioning a header data part (HDP) bit region, a motion vector data part (MVDP) bit region and a discrete cosine transform data part (DDP) bit region from each macro block of the video data in an error resilient mode; (b) variable-length-coding the partitioned bit regions; (c) reversible-variable-length-coding the bit regions selected from the variable-length coded bit regions according to a predetermined priority for recovery; and (d) inserting markers into the variable-length coded or reversible-variable-length-coded bit regions.

To achieve the second object, there is provided a computer readable medium having embodied thereon a computer program for executing the video CODEC method which comprises the steps of: (a) partitioning a header data part (HDP) bit region, a motion vector data part (MVDP) bit region and a discrete cosine transform data part (DDP) bit region from each macro block of the video data in an error resilient mode; (b) variable-length-coding the partitioned bit regions; (c) reversible-variable-length-coding the bit regions selected from the variable-length coded bit regions according to a predetermined priority for recovery; and (d) inserting markers into the variable-length coded or reversible-variable-length-coded bit regions.

To achieve the third object, there is provided a video CODEC apparatus comprising: a partitioning unit for partitioning a header data part (HDP) bit region, a motion vector data part (MVDP) bit region and a discrete cosine transform data part (DDP) bit region from each macro block of the video data in an error resilient mode; a variable length coding unit for variable-length-coding the partitioned bit regions; a reversible variable length coding unit for reversible-variable-length-coding the bit regions selected from the variable-length coded bit regions according to a predetermined priority for recovery; and a marker inserting unit for inserting markers into the variable-length coded or reversible-variable-length-coded bit regions.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
FIG. 1 shows an example of a video data packet generated during conventional coding-decoding (CODEC) in an error resilient mode.
Figure 2:
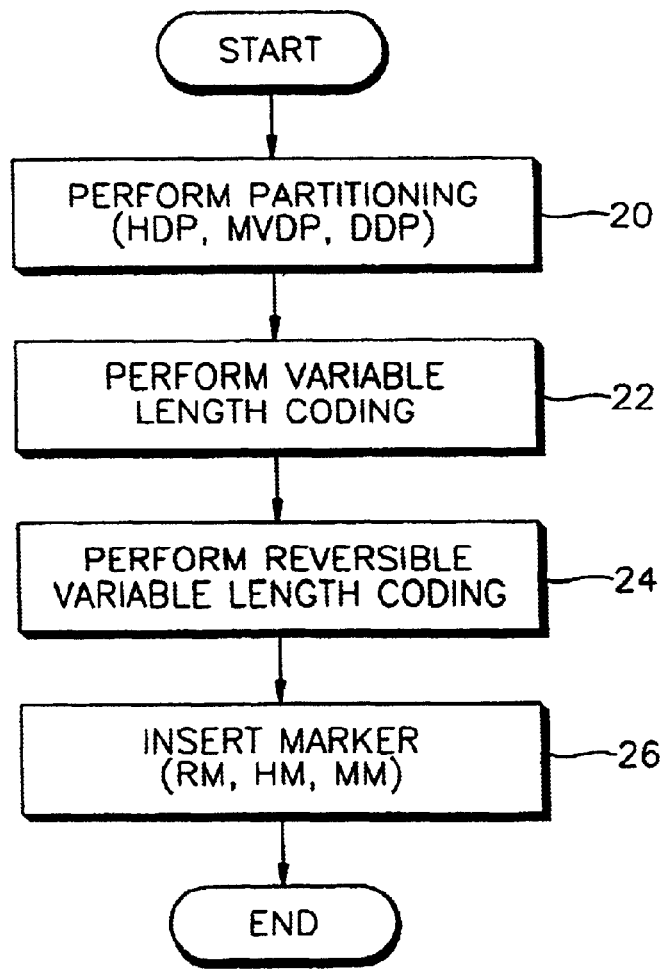
FIG. 2 is a flowchart illustrating the main steps of a video CODEC method in an error resilient mode according to a preferred embodiment of the present invention.

Referring to FIG. 2, wherein the main steps of a video coding-decoding (CODEC) method in an error resilient mode according to a preferred embodiment of the present invention are illustrated, the video CODEC method includes a partitioning step 20, a variable length coding step 22, a reversible variable length coding step 24 performed for selected bit regions, and a marker inserting step 26.

In the step 20, a header data part (HDP) bit region is constituted by partitioning header data. In a similar manner, a motion vector data part (MVDP) bit region and a discrete cosine transform (DCT) data part (DDP) bit region are constituted by partitioning motion vector data and DCT data, respectively.

The header data includes information about coding status of the current macro block. That is, the header data represents whether the current macro block is an intra macro block in which the content of the current frame is coded as it is, or an inter macro block in which the difference from a previous macro block is coded. Thus, if an error occurs in the deader data, very critical information loss would be caused.

Thus, due to the significance of the header data, the header data must be recovered first. For this reason, among the HDP, a macro block identification bit (COD) indicating whether coding is performed or not and a macro block pattern chrominance (MCBPC) bit may be combined into one new syntax (COD+MCBPC) for partitioning. This combination for partitioning is preferred due to the following reasons. In the H.263 standard, 1 bit is used for the COD bit and a variable length code is used for the MCBPC bit of the header data. However, because the COD bit can have both 0 and 1, it is difficult to detect that the COD bit has an error. Also, in case that the MCBPC bit using a variable length code table has an error, it is very likely that the erroneous bit exists in a variable length code table, so that the detecting the error is difficult. Thus, in this embodiment, the COD bit and the MCBPC bit are combined for partitioning, and the combined bit region is reversible-variable-length-coded, thereby easily detecting the change in the bit. For example, in the case of data 0110, an error such as 0101 or 1001 can be detected, so that the possibility of using the erroneous information is reduced. Further, because the reversible variable length coding is performed, backward recovery is also possible. However, the HDP region may be constituted through partitioning without a combination of bits.

Also, the step 20 is performed in macro block units so that it is preferred to include the step of inserting a macro block address (MBA) bit region indicating the serial number of the first macro block into each packet, which can be referred to for decoding. Also, preferably, the step 20 includes the step of inserting a last motion vector value (LMVV) bit including absolute motion vector information, not a predicted motion vector, after the MVDP bit region. More preferably, the step 20 further includes the step of inserting a packet number (PN) bit region as additional information indicating a serial number of the packet.

In the variable length coding step 22, variable-length-coding is performed on the HDP bit region, the MVDP bit region and DDP bit region. Also, the PN and (LMVV) bit regions are variable-length-coded.

In the reversible variable length coding step 24, reversible variable length coding is performed on the variable-length-coded bit regions selected according to a predetermined priority for recovery. That is, if information loss may occur during the decoding, the reversible variable length coding is performed on the important information of the entire packet or macro block which may be lost. The reasons for the priority will be described in detail. First, as described above, the header data represents whether the current macro block is an inter macro block in which the content of the current frame is coded as it is, or an intra macro block in which the difference from a previous macro block is coded. Almost complete macro blocks are constituted of inter macro blocks so as to increase the efficiency of compression. If an error occurs in the HDP of the inter macro block, both the MVDP and the DDP cannot be used. Also, if an error occurs in the MVDP, it is not possible to use the DDP. Thus, each data part is important in the sequence of the HDP, the MVDP and the DDP. That is, the priority exists within the macro block according to such significance, and recovery in accordance with the priority is required. Here, using such selective reversible variable length coding according to the priority, not all data is considered due to a limited channel capacity while the reversible variable length coding increases the number of bits compared to the variable length coding. In the video CODEC method according to the present invention, which is not shown in FIG. 2, information of channel characteristics such as capacity, error status and degree of congestion is received through a backward channel, to identify the channel characteristics. In the channel characteristic identifying step, preferably, if a suitable channel status exists, a predetermined bit region having a low priority, e.g., DDP bit region, is reversible-variable-length-coded. Otherwise, the bit region is only variable-length-coded, thereby satisfying the channel characteristics as well as increasing error resilience. Alternatively, in the channel characteristic identifying step, if a suitable channel status exists, an additional information may be inserted into a bit region having a lower priority, such as DDT bit region, to be referred to for decoding. Hereinafter the use of the additional information will be described in detail. First, it is possible to additionally transfer the information of the HDP into the DDT. This is for the case where an error occurs in the HDP with priority, not in the MVDP and the DDP. By placing the HDP after the DDP, the current data packet can be recovered without being discarded. Second, it is possible to transfer a CRC (abbreviation for cyclic redundancy checking) as additional information into the DDP. For example, in the DDP bit region, an 8-bit fixed length code is used as a direct current (DC) value and a variable length code is used as an alternating current (AC) value. It is relatively difficult to detect an error from the 8-bit fixed length code. In order to help detect an error, the CRC is added to the 8-bit fixed length code, thereby improving recovery characteristics. Also, another fixed length code, e.g., a quantization part (QP) indicating a quantization value, as well as the 8-bit fixed length code may be used to obtain the CRC. That is, by adding the CRC to a fixed length code of the DDP, the error recovery characteristics during decoding can be improved. That is, the additional information of the above two cases is for assisting in the recovery of the erroneous region of the current packet, or detecting the region that is difficult to detect errors in. Also, in this embodiment of the video CODEC method in an error resilient mode, different RVLC tables are used according to the channel characteristics in the channel characteristic identifying step for the RVLC, such that the error detection can be more effective.

In the marker inserting step 26, a resync marker (RM) for identifying packets, and a header marker (HM) as an information bit for identifying an HDP and an MVDP are inserted. Also, a motion marker (MM) for identifying the MVDP and the DDP is inserted. Preferably, the HM is constituted by codewords which are not used for coding the HDP, to be distinguishable during decoding. Before inserting the resync marker (RM), a byte-alignment process is preformed.

Figure 3:
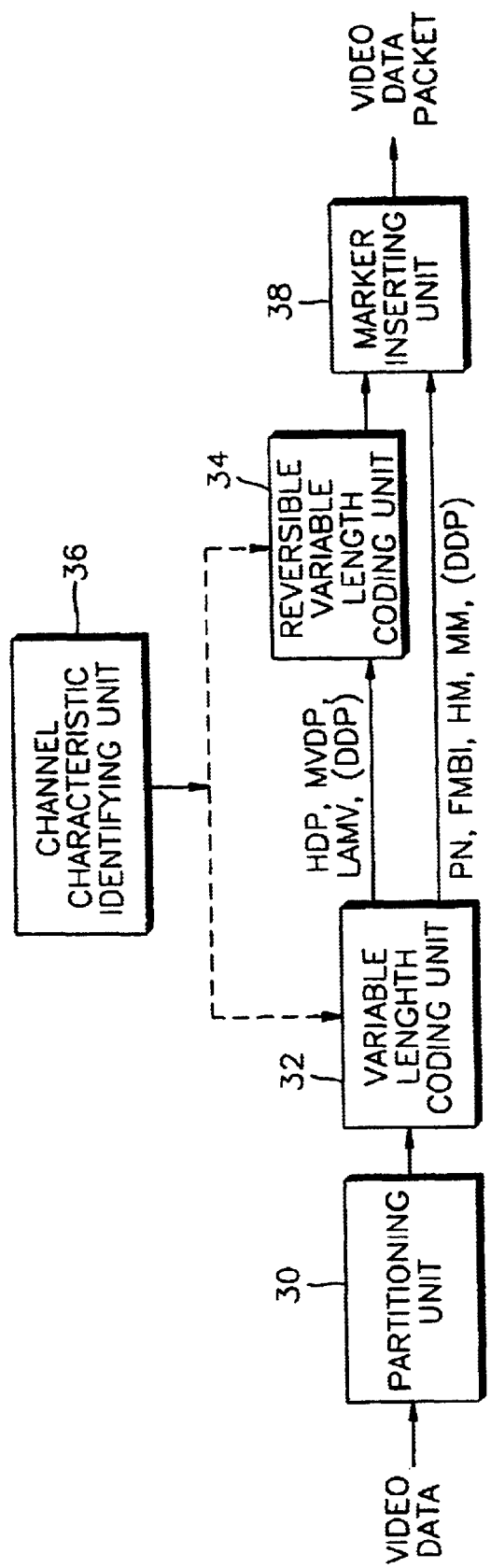
FIG. 3 is a block diagram of a video CODEC apparatus in an error resilient mode according to a preferred embodiment of the present invention.

FIG. 3 shows a video CODEC apparatus in an error resilient mode according to a preferred embodiment of the present invention, for achieving the above video CODEC method. Referring to FIG. 3, the video CODEC apparatus includes a partitioning unit 30, a variable length coding unit 32, a reversible variable length coding unit 34 for reversible-variable-length-coding the variable-length-coded bit regions selected according to a predetermined priority for recovery, a channel identifying unit 36 for identifying the channel characteristics by receiving information about channel characteristics such as capacity, error status and degree of congestion, e.g., through a backward channel (not shown), and a marker inserting unit 38 for inserting a marker into the variable-length-coded or reversible-variable-length-coded bit region.

The partitioning unit 30 receives video data and partitions a HDP bit region, an MVDP bit region and a DDP bit region from each macro block of the video data in an error resilient mode as described with reference to FIG. 2. Also, preferably, the partitioning unit 30 constitutes the HDP bit region by combining a predetermined number of bit regions having a higher priority for recovery, e.g., a COD bit and MCBPC bit, into one new syntax (COD+MCBPC) during the partitioning.

The variable length coding unit 32 receives the partitioned bit regions and performs variable length coding, and the reversible variable length coding unit 34 performs reversible-variable-length-coding on the bit regions selected from the variable-length-coded bit regions according to a predetermined priority for recovery, e.g., according to possibility of loss of an entire packet or macro block during the decoding, which has good error recovery characteristics. However, the reversible-variable-length-coding increases the number of bits compared to the variable-length-coding, so that it is preferable to do the reversible-variable-length-coding on only the bit regions selected according to the priority for recovery, taking into consideration the limited channel capacity.

To this end, the channel characteristic identifying unit 36 controls the variable length coding unit 32 and the reversible variable length coding unit 34 such that if a suitable channel status exists, a bit region having a low priority, such as a DDP bit region, is reversible-variable-length-coded, and otherwise, the bit region is variable-length-coded. Alternatively, an additional information inserting unit (not shown) may be further included so as to insert an additional information into a bit region having a low priority, such as the DDP bit region, if the channel characteristic identifying unit 36 determines that a suitable channel status exists. Preferably, if the channel characteristic identifying unit 36 determines that the suitable channel status exists, the reversible variable length coding unit 34 performs the reversible-variable-length-coding using different coding tables to achieve the same effect as described with reference to FIG. 2.

Also, the video CODEC apparatus according to the present invention may further comprise an FMBI bit region inserting unit (not shown) for inserting an FMBI indicating a serial number of the first macro block of each packet so as to achieve the same effect as described with reference to FIG. 2, and the reversible variable length coding unit 34 may perform reversible-variable-length-coding on an (LMVV) bit region. Preferably, the video CODEC apparatus further comprises a unit (not shown) for inserting a PN bit region indicating a serial number of the packet following the RM bit region, as additional information, and a unit (not shown) for inserting the (LMVV) bit region including an absolute motion vector information after the MVDP bit region.

Also, the marker inserting unit 38 inserts a resync marker (RM) for separating into packets, a header marker (HM) consisting of codewords which are not used to code the HDP bit region, as an information bit for dividing the HDP and the MVDP, and a motion marker (MM) for dividing the MVDP and the DCT. Here, the HM consists of codewords which are not used to code the HDP to be distinguished during the decoding.

Figure 4:
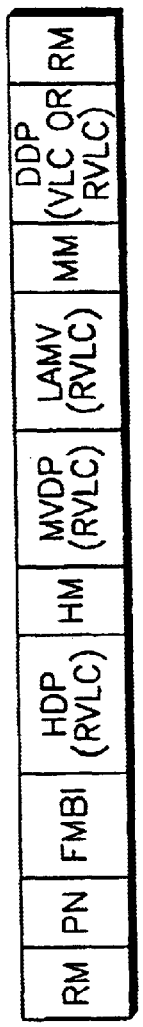
FIG. 4 shows an example of a video data packet generated by the error resilient video CODEC method according to the present invention.

FIG. 4 shows an example of a video data packet obtained by the video CODEC method according to the present invention. Referring to FIG. 4, the video data packet generated by the video CODEC method includes an RM bit region, a PN bit region, an MBA bit region, a HDP bit region, a HM bit region, a MVDP bit region, a (LMVV) bit region, an MM bit region and a DDP bit region. In the video data packet including such bit regions, the RM bit indicates the start of the video data packet, such that the starting point of a packet can be found for decoding as described in the prior art. Also, the PN indicates a serial number of each packet and may be used as additional information, and the MBA bit indicates a serial number of the first macro block of each packet. In this embodiment, the HDP bit is obtained by combining a COD bit and an MCBPC bit defined in the MPEG-4 or the H.263 standard into one new syntax (COD+MCBPC) and then performing the reversible-variable-length-coding on the combined bit. Also, the HM bit as an information bit for dividing the HDP and the MVDP consists of codewords which are not used to code the HDP bit. The MVDP bit is obtained by performing the reversible-variable-length-coding on the information generated from the motion vector through prediction. In the DDP bit region including information about discrete cosine transform (DCT), a coded block pattern luminance (COBY) bit, a data quantization (DQUANT) bit and a DCT coefficient are coded. Also, it is preferable to insert the information required for error identification and restoration during the decoding, among the information used in the current packet, into the DDP bit. Such insertion of information may be selectively applied depending on the channel characteristics. The MM bit is for dividing the MVDP bit and the DDP bit.

The decoding process for the video data packet encoded as above will be described. First, when an RM is found in the received bit stream, the bit stream between the found RM and the next RM is regarded as one packet as described in the prior art. If an error occurs in the HDP bit, the HDP bit can be decoded backward as well as forward because the HDP has been reversible-variable-length-coded. For example, the HDP bit can be recovered by using the PN and the MBA of the next packet. That is, because the macro block number of the current packet corresponds to the value obtained by subtracting the MBA of the next packet by 1, the HDP bit can be recovered up to the previous region of erroneous macro block region through backward coding. Also, the MVDP bit is decoded until the MM is found, thereby decoding the motion vector through prediction. If an error occurs during such decoding process, decoding in backward direction is also possible because the MVDP bit has been reversible-variable-length-coded. Comparatively, in a decoding process for the video data packet encoded by the conventional CODEC method, only the predicted motion vector exists in the MVDP bit, so that it is possible to use an actual motion vector only when the previously decoded motion vector exists. However, in the video CODEC method according to the present invention, the last motion vector value (LMVV) as an absolute motion vector, not a predicted motion vector, is reversible-variable-length-decoded to be transmitted. Thus, in the case of the reversible variable length decoding using the (LMVV) it is independent from the previous motion vector. Also, in case that an error occurs in the DDP bit region, if the DDP bit region has been variable-length-coded, the packet must be discarded. However, if the DDP bit region has been reversible-variable-length-coded, decoding is possible in a backward direction, providing more resilience against channel error. Also, in case that additional information required for restoration is encoded in the DDP bit region, such additional information can be used for decoding.

Figure 5:
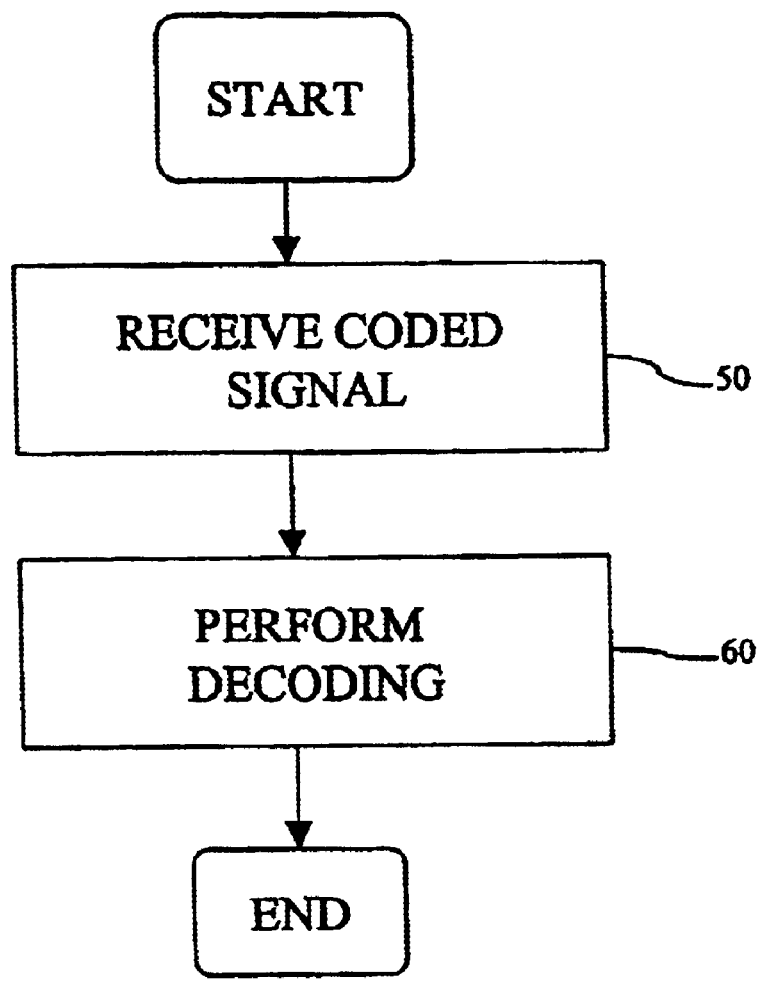
FIG. 5 is a flowchart illustrating the main steps of a decoding method of a video CODEC.
Figure 6:
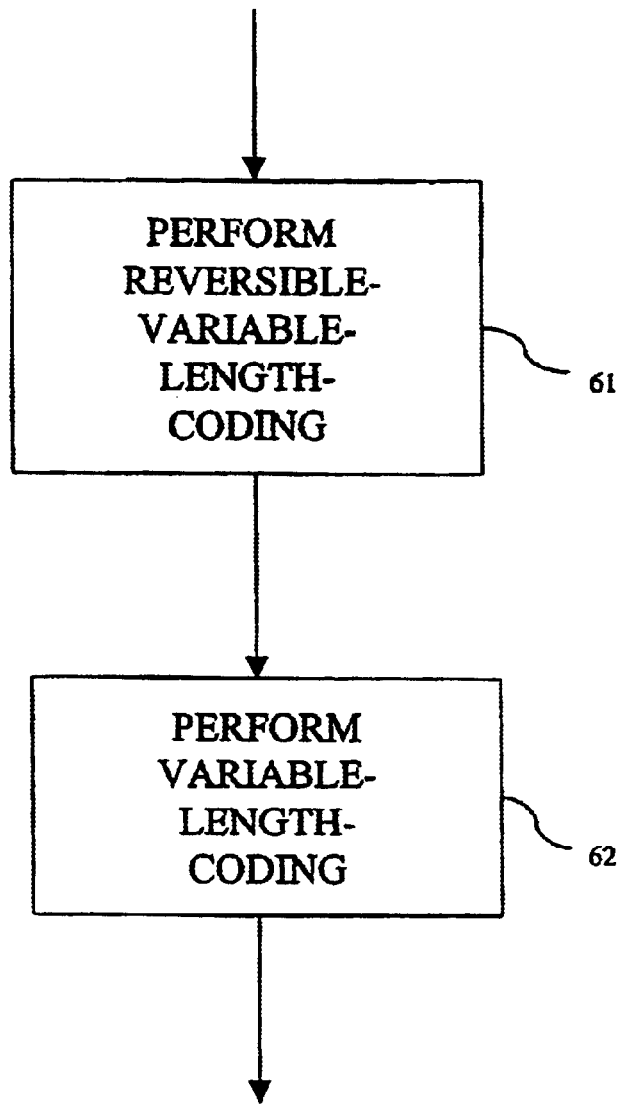
FIG. 6 is a flowchart illustrating in more detail the decoding step of the flowchart of FIG. 5.

FIG. 5 is a flowchart representing general decoding steps of the invention. Step 50 indicates that a coded signal is received, and step 60 indicates that decoding is performed. FIG. 6 shows that the decoding performed in step 60 of FIG.

5 is performed using reversible-variable-length decoding (step 61) and using variable-length-decoding (step 62).

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium having a computer readable program code unit embodied therein for video CODEC, the computer readable program code means in the computer usable medium comprising: computer readable program code means for partitioning an HDP bit region, an MVDP bit region and a DDP bit region from each macro block of the video data in an error resilient mode; computer readable program code means for variable-length-coding the partitioned bit regions; computer readable program code means for reversible-variable-length-coding the bit regions selected from the variable-length coded bit regions according to a predetermined priority for recovery; and computer readable program code means for inserting makers into the variable-length coded or reversible-variable-length-coded bit regions. A functional program, code and code segments, used to implement the present invention can be derived by a skilled computer programmer from the description of the invention contained herein.

As described above, the video CODEC method according to the present invention can provide more resilience against channel error, so that communications is less affected by error under conditions in which errors are a serious problem such as in a wireless communications channel.

Although specific terms are employed in the above embodiment based on the MPEG-4 Visual and the H.263 standards, such as RM, PN, MBA, HDP, HM, MVDP, MM and DDP, they are used in a generic and descriptive sense only, and not for purposes of limitation. Thus, the video CODEC method of the present invention can be applied to all video CODECs adopting different bit regions which are equivalent to the bit regions described by the above specific terms.

What is claimed is:

1. A video coding-decoding (CODEC) method for coding vide data to generate a video data packet and for decoding the packet, comprising the steps of:
    (a) partitioning a header data part (HDP) bit region, a motion vector data part (MVDP) bit region and a discrete cosine transform data part (DDP) bit region from each macro block of the video data in an error resilient mode;
    (b) variable-length-coding the partitioned bit regions;
    (c) reversible-variable-length-coding the bit regions selected from the variable-length coded bit regions according to a predetermined priority for recovery; and
    (d) inserting markers into the variable-length-coded or reversible-variable-length-coded bit regions.

2. The method of claim 1, wherein in the step (c) the HDP bit region and the MVDP bit region are reversible-variable-length-coded.

3. The method of claim 2, wherein the step (a) comprises a step of inserting a last motion vector value (LMVV) bit including absolute motion vector information after the MVDP bit region.

4. The method of claim 3, wherein the LMVV bit region is reversible-variable-length-coded.

5. The method of claim 3, further comprising a decoding step for decoding the last motion vector value (LMVV).

6. The method of claim 5, wherein said decoding step includes variable length decoding the LMVV.

7. The method of claims 5, wherein said decoding step includes reversible variable length decoding the LMVV.

8. The method of claim 5, wherein said decoding step includes a step for reversible-variable-length-decoding using the decoded LMVV.

9. The method of claim 1, wherein the HDP bit region is constituted by combining a plurality of bit regions which highly contribute to restoration into one information bit.

10. The method of claim 9, wherein the plurality of bit regions are a macro block identification bit (COD) and a macro block pattern chrominance (MCBPC) bit which are important for recovery, and the COD bit and the MCBPC bit are combined into one new syntax (COD+MCBPC).

11. The method of claim 1, wherein the step (a) comprises a step of inserting a macro block address (MBA) bit region into which the serial number of the first macro block is written.

12. The method of claim 1, further comprising a step of inserting a packet number (PN) bit region as an additional information for indicating a serial number of the packet after the RM bit region.

13. The method of claim 1, wherein the step (d) comprises the steps of:
    (d1) inserting a resync marker (RM) for dividing each packet;
    (d2) inserting a head marker (HM) as an information bit for dividing the HDP and MVDP bit regions, consisting of codewords which are not used to code the HDP bit region; and
    (d3) inserting a motion marker (MM) for dividing the MVDP and DDP bit regions.

14. The method of claim 1, further comprising a step of identifying channel characteristics,
    wherein the step of identifying the channel characteristics further comprises a step of reversible-variable-length-coding a predetermined bit region having a low priority if a suitable channel status exists, and variable-length-coding the bit region if the suitable channel status does not exist.

15. The method of claim 14, wherein the predetermined bit region is the DDP bit region.

16. The method of claim 1, further comprising the steps of:
    identifying channel characteristics; and
    inserting an additional information into a predetermined bit region having a low priority if it is determined that a suitable channel status exists in the step of identifying the channel characteristics.

17. The method of claim 16, wherein the predetermined bit region is the DDP bit region.

18. The method of claim 1, further comprising a step of identifying channel characteristics,
    wherein if it is determined that a suitable channel status exists in the step of identifying the channel characteristics, the reversible variable length coding is performed using different coding tables.

19. A computer readable medium having embodied thereon a computer program for executing a video coding-decoding (CODEC) method of coding video data to generate a video data packet and of decoding the packet,
    wherein the video CODEC method comprises the steps of:
    (a) partitioning a header data part (HDP) bit region, a motion vector data part (MVDP) bit region and a discrete cosine transform data part (DDP) bit region from each macro block of the video data in an error resilient mode;
    (b) variable-length-coding the partitioned bit regions;

(c) reversible-variable-length-coding the bit regions selected from the variable-length coded bit regions according to a predetermined priority for recovery; and (d) inserting markers into the variable-length coded or reversible-variable-length-coded bit regions.

20. A video coding-decoding (CODEC) apparatus for coding video data to generate a video data packet and for decoding the packet, comprising:

a partitioning unit for partitioning a header data part (HDP) bit region, a motion vector data part (MVDP) bit region and a discrete cosine transform data part (DDP) bit region from each macro block of the video data in an error resilient mode;

a variable length coding unit for variable-length-coding the partitioned bit regions;

a reversible variable length coding unit for reversible-variable-length-coding the bit regions selected from the variable-length coded bit regions according to a predetermined priority for recovery; and a marker inserting unit for inserting markers into the variable-length coded or reversible-variable-length-coded bit regions.

21. The apparatus of claim 20, wherein the reversible variable length coding unit reversible-variable-length-codes the HDP bit region and the MVDP bit region.

22. The apparatus of claim 20, wherein the partitioning unit constitutes the HDP bit region as one information bit by combining a plurality of bit regions which highly contribute to recovery.

23. The apparatus of claim 22, wherein the plurality of bit regions are a macro block identification bit (COD) and a macro block pattern chrominance (MCBPC) bit which are important for recovery, and the COD bit and the MCBPC bit are combined into one new syntax (COD+MCBPC).

24. The apparatus of claim 20, further comprising a unit for inserting a macro block address (MBA) bit region indicating the serial number of the first macro block of each packet.

25. The apparatus of claim 20, further comprising a unit for inserting a last motion vector value (LMVV) bit including absolute motion vector information into a LMVV bit region after the MVDP bit region.

26. The apparatus of claim 25, wherein the reversible variable length coding unit reversible-variable-length-codes the LMVV bit region.

27. The apparatus of claim 20, further comprising a unit for inserting a packet number (PN) bit region as an additional information for indicating a serial number of the packet after the RM bit region.

28. The apparatus of claim 20, wherein the marker inserting unit inserts a resync marker (RM) for dividing each packet, a head marker (HM) as an information bit for dividing the HDP and MVDP bit regions, consisting of codewords which are not used to code the HDP bit region, and a motion marker (MM) for dividing the MVDP and DDP bit regions.

29. The apparatus of claim 20, further comprising a channel characteristic identifying unit, wherein the channel characteristic identifying unit controls the reversible variable length coding unit and the variable length coding unit such that if a suitable channel status exists, a predetermined bit region having a low priority is reversible-variable-length-coded, and if the suitable channel status does not exist, the predetermined bit region is variable-length-coded.

30. The apparatus of claim 29, wherein the predetermined bit region is the DDP bit region.

31. The apparatus of claim 20, further comprising:

a channel characteristic identifying unit for identifying the channel characteristics; and an additional information inserting unit for inserting an additional information into a predetermined bit region having a low priority if it is determined in the channel characteristic identifying unit that a suitable channel status exists.

32. The apparatus of claim 31, wherein the predetermined bit region is the DDP bit region.

33. The apparatus of claim 20, further comprising a channel characteristic identifying unit for identifying the channel characteristics, wherein the reversible variable length coding unit performs reversible-variable-length-coding using different coding tables if it is determined in the channel characteristic identifying unit that the channel characteristics are in reverse order.

34. The apparatus of claim 20, further comprising a decoder for decoding an output of said marker inserting unit.

35. The apparatus of claim 34, wherein said decoder performs a variable length decoding of the LMVV.

36. The apparatus of claim 34, wherein said decoder performs a variable length decoding of the LMVV.

* * * * *